United States Patent [19]

Austin et al.

[11] 3,757,488

[45] Sept. 11, 1973

[54] GAS REMOVAL METHOD AND COMPOSITION

[75] Inventors: Robert R. Austin, Pasadena; Arthur Leonard Vincent, Monrovia, both of Calif.

[73] Assignee: International Telephone and Telegraph Corporation, New York, N.Y.

[22] Filed: Dec. 5, 1972

[21] Appl. No.: 312,293

Related U.S. Application Data

[60] Division of Ser. No. 188,540, Oct. 12, 1971, abandoned, Continuation-in-part of Ser. No. 137,994, April 27, 1971, abandoned.

[52] U.S. Cl. .................................................. 55/73
[51] Int. Cl. ............................................ B01d 53/16
[58] Field of Search......................... 55/73, 84, 68

[56] References Cited
UNITED STATES PATENTS
3,672,125   6/1972   Miller ..................................... 55/73

Primary Examiner—Charles N. Hart
Attorney—C. Cornell Remsen, Jr., Thomas E. Kristofferson et al.

[57] ABSTRACT

A selective method of removing sulfur dioxide from flue gases or the like containing both sulfur dioxide and hydrogen sulfide without removing the hydrogen sulfide by bubbling the flue gas through about a 5–95 percent solution of an organic acid and an alkali metal salt of the said acid. The acid is selected from the group of: citric malic, lactic, succinic, ascorbic and tartaric. The acid is preferably citric and the alkali metal is preferably potassium. The ratio of the weight of the salt to that of the acid may be within the range of about $1s: 2a$ to $6s: 1a$ as such as is needed to make the solution pH between about 4.0 and 6.0, where $s$ and $a$ are one mole each of said salt and said acid, respectively. The said ratio preferably is $5s:1a$ or the pH is preferably 5.7.

8 Claims, No Drawings

GAS REMOVAL METHOD AND COMPOSITION

This application is a division of copending application Ser. No. 188,540, filed Oct. 12, 1971, for GAS REMOVAL METHOD AND COMPOSITION. Said application Ser. No. 188,540 was, in turn, a continuation-in-part of copending application Ser. No. 137,994, filed Apr. 27, 1971, of the same title, but now abandoned. The benefits of the filing dates of both of said copending applications are hereby claimed for this application.

BACKGROUND OF THE INVENTION

This invention relates to the art of separating gases, and more particularly, to a method of separating sulfur dioxide from hydrogen sulfide and other gases, and a composition which may be employed in practicing the method.

The method and composition of the present invention will be found useful in many applications and are, therefore, not to be limited to those disclosed herein. However, the present invention has been found especially useful in separating and monitoring sulfur dioxide and/or hydrogen sulfide in flue gases.

In the paper industry, it is of interest especially in the recent past to monitor sulfur dioxide and hydrogen sulfide in flue gases. Monitoring is required for the protection of the ecology. This is, the extent and cause of a pollution problem must be known before a solution can be found.

Such monitoring has already been accomplished by alternately passing the sample gas: (1) directly through a coulometric titrator as disclosed in U. S. Pat. No. 3,448,031; and (2) first through a 3 percent solution of potassium biphthalate ($KHC_8H_6O_4$) and then through the coulometric titrator. The biphthalate solution, as taught in the prior art, will remove about 95 percent of the $SO_2$ while passing most of the $H_2S$. The output of the coulometric titrator is an electrical signal whose amplitude is directly proportional, on the direct flow sample, to the sum of the sulfur dioxide and the hydrogen sulfide in the flue gas and on the filtered sample, to the approximate concentration of hydrogen sulfide in the flue gas. The $SO_2$ content is obtained by subtracting the titration current for the $H_2S$ reading from the titration current from the $H_2S + SO_2$ reading.

Notwithstanding the desirability of monitoring the sulfur dioxide and hydrogen sulfide independently, the above-described prior art system suffers from three serious disadvantages.

The first is that the prior art solution has a very short life. For example, the prior art solution, when having a concentration, by weight, of about 2 percent, will remove about 95 percent of the sulfur dioxide for only a period of about 6 hours. The sulfur dioxide absorption of the prior art solution is also undesirably low, and hydrgen sulfide rejection is not as good as is desired.

SUMMARY OF THE INVENTION

In accordance with the present invention, the above-described and other disadvantages of the prior art are overcome by the use of one of a group of organic acids with an alkali metal salt thereof.

In accordance with the invention, an aqueous solution of a 23 percent concentration by weight of solid will have a life of about 8 days during which sulfur dioxide absorption will be 99.8 percent. Further, the solution of the invention has a better hydrogen sulfide rejection than the said prior art solution.

The above-described and other advantages of the present invention will be better understood from the following descripton.

DESCRIPTION OF THE PREFERRED EMBODIMENTS

The method of the present invention may be practiced by contacting flue gases containing both sulfur dioxide and hydrogen sulfide with an aqueous solution of an organic acid and an alkali metal salt of the selfsame acid. The acid should be selected from the group of: citric acid, malic acid, lactic acid, succinic acid, ascorbic acid and tartaric acid.

Contacting may be performed by passing the flue gas through a conventional scrubber containing the said solution. For example, it is common to use such a scrubber incorporating an air tight receptacle in which the solution is contained, the receptacle having a tubular gas outlet sealed thereto having an opening inside the receptacle above the uppermost level of the solution. A tubular gas inlet is also sealed thereto. The gas inlet has a lower end which extends downwardly inside the receptacle and is located so as to release the flue gas below the said uppermost level of the said solution so as to bubble the flue gas through the solution. Bubblers of several different varieties may be employed, if desired. For example, the bubbler disclosed in the said patent may be employed in accordance with the present invention.

In accordance with the foregoing, both sulfur dioxide and hydrogen sulfide contained in the main flow of flue gases may be independently monitored. The apparatus for performing the method of the present invention to monitor either one or both of the sulfur dioxide and hydrogen sulfide gases may be entirely conventional apart from the said solution and, if desired, may be of the prior art type disclosed or referred to herein.

The said solution of the present invention may be made in several ways. In all cases, the concentration is preferably in excess of 5 percent. It also may be more convenient to make up a solution with a concentration of about 95 percent or less, or at least a solution which does not contain the acid and salt in excess of saturation. However, a more concentrated solution will have a longer useful life.

The ratio of the weight of the salt to the acid may be between about $1s:2a$ and $6s:1a$, where $s$ and $a$ are one mole each of the said salt and the said acid, respectively. Preferably, the said ratio is about $5s:1a$.

The ratio may also be made for a desirably pH range. It was erroneously calculated to be 4.0 to 5.6, but was later found to be 4.0 to 6.0 by use of a pH meter. The preferred pH was erroneously calculated to be 5.4 but was later found to be 5.7 by use of the pH meter.

According to a preferred embodiment of the present invention, the acid is citric acid and the salt is potassium citrate.

The phrase "percent of concentration," when used without the phrase "by weight" is hereby defined for use herein and in the claims to mean the percent of saturation at 20°C. of the least soluble component of the acid-salt system. Note will be taken that, for example, regardless of the salt mixed with water, the resulting component may or may not be the selfsame salt. Thus poteassium citrate may reduce to potassium dihydrogen citrate or potassium monohydrogen citrate.

The word "component" is, therefore, hereby defined as including anything but water in the said solution, including, but not limited to, the acid and salt of the original mix and compounds or elements resulting from any changes thereof produced in the solution.

EXAMPLE NO. 1

An aqueous solution of 0.2 mole of citric acid and 1.0 mole potassium citrate in one liter of water was made. This resulted in a solution concentration of 23 percent, by weight. The pH of the resulting solution was erroneously calculated to be 5.4 but was later found to be 5.7 on the pH meter. Sulfur dioxide was bubbled through this solution. The 99.8 percent of the sulfur dioxide was absorbed from a sample gas at 300 parts per million $SO_2$ concentration for a period of about 8 days.

EXAMPLE NO. 2

A solution of citric acid of a concentration of 50 percent was prepared. Enough potassium hydroxide was added to the said citric acid solution to increase pH of the resulting solution to what was erroneously calculated to be 5.4. However, the pH was found to be 5.7 by the use of the pH meter. $SO_2$ was bubbled through this solution and the solution absorbed 99.8 percent of the $SO_2$.

EXAMPLE NO. 3

A solution was prepared by mixing 1.2 moles (161 grams) of malic acid with 2.4 moles (97 grams) of sodium hydroxide in a liter of water. This solution had a pH of 5.7. $SO_2$ was bubbled through this solution. The absorption of the $SO_2$ was 99.8 percent.

EXAMPLE NO. 4

A solution was prepared by mixing 1.0 mole of potassium citrate with 0.2 mole of citric acid in a liter of water. Enough citric acid was further mixed with the solution to decrease its pH to 4.1. $SO_2$ was then bubbled through the solution. This resulted in a $SO_2$ absorption of 93 percent.

EXAMPLE NO. 5

A solution was prepared by mixing 1.0 mole of potassium citrate with 0.2 mole of citric acid in a liter of water. Enough potassium hydroxide was then mixed with the solution to increase its pH to 6.0. $H_2S$ absorption was then 6 percent.

From the foregoing, it will be appreciated that the inventive solution absorption of $SO_2$ is quite large at a pH of 5.7 and higher and is still 93 percent at a pH of 4.0. Further, there is substantially complete $H_2S$ rejection at and below a pH of 5.7 and a 94 percent rejection at 6.0. The low end of the preferred pH range is thus determined by the minimum percent $SO_2$ absorption permitted. The high end of the preferred pH range is determined by the minimum $H_2S$ rejection permitted.

What is claimed is:

1. The method of selective gas removal, said method comprising the steps of: contacting a mixture of gases including at least sulfur dioxide and hydrogen sulfide with an aqueous solution containing both an organic acid and at least one alkali metal salt of said acid in a manner to cause the said sulfur dioxide to be retained in said solution but without causing the said hydrogen sulfide to be retained therein, said acid being a material selected from the group consisting of citric acid, malic acid, lactic acid, succinic acid, ascorbic acid and tartaric acid, said solution being of a concentration of at least 5 percent.

2. The invention as defined in claim 1, wherein said solution has a concentration of between about 5 percent to about 95 percent.

3. The invention as defined in claim 2, wherein the ratio of the weight of said salt to said acid is such that the pH of said solution is between about 4.0 and 6.0.

4. The invention as defined in claim 3, wherein said acid is citric acid, said salt being potassium citrate.

5. The invention as defined in claim 4, wherein said concentration is about 95 percent and said pH is about 5.7.

6. The invention as defined in claim 1, wherein the ratio of the weight of said salt to said acid is from about 1s:2a to about 6s:1a, where s and a are one mole each of said salt and said acid, respectively.

7. The invention as defined in claim 6, wherein said acid is citric acid, said salt being potassium citrate.

8. The invention as defined in claim 7, wherein said concentration is about 95 percent and said ratio is about 5s:1a.

* * * * *